US007280616B2

(12) United States Patent
Arambepola et al.

(10) Patent No.: US 7,280,616 B2
(45) Date of Patent: Oct. 9, 2007

(54) OPTIMIZING A FILTER BANDWIDTH IN A DIGITAL RECEIVER

(75) Inventors: Bernard Arambepola, London (GB); Nicholas Paul Cowley, Wroughton (GB)

(73) Assignee: Intel Corporation, Santa Clara, CA (US)

( * ) Notice: Subject to any disclaimer, the term of this patent is extended or adjusted under 35 U.S.C. 154(b) by 749 days.

(21) Appl. No.: 10/694,931

(22) Filed: Oct. 27, 2003

(65) Prior Publication Data

US 2004/0131124 A1  Jul. 8, 2004

(30) Foreign Application Priority Data

Nov. 2, 2002  (GB) ................. 0225598.2

(51) Int. Cl.
*H03K 9/00* (2006.01)
*H04L 27/00* (2006.01)

(52) U.S. Cl. .................................... 375/316
(58) Field of Classification Search ......... 375/232, 375/350, 316, 240.07
See application file for complete search history.

(56) References Cited

U.S. PATENT DOCUMENTS

| 5,155,862 | A | 10/1992 | Hansen |
| 5,715,281 | A * | 2/1998 | Bly et al. ................ 375/344 |
| 6,172,543 | B1 * | 1/2001 | Kurisu ..................... 327/255 |
| 6,356,746 | B1 * | 3/2002 | Katayama ................ 455/324 |
| 6,895,063 | B1 | 5/2005 | Cowley et al. |
| 2001/0021234 | A1 * | 9/2001 | Katayama et al. ........ 375/344 |
| 2002/0075971 | A1 * | 6/2002 | Cowley et al. ........... 375/316 |
| 2003/0206603 | A1 * | 11/2003 | Husted .................... 375/324 |
| 2006/0281432 | A1 | 12/2006 | Isaac et al. |

FOREIGN PATENT DOCUMENTS

EP  1 182 788 A1  2/2002

OTHER PUBLICATIONS

Patents Act 1977: Search Report under Section 17 for United Kingdom Counterpart Application No. GB 0225598.2 (Jul. 21, 2003).
"ETSI (European Standard (Telecommunications series) EN 300 744: Digital Video Broadcasting (DVB); Framing structure, channel coding and modulation for digital terrestrial television," Version 1.4.1, ETSI, 850 Route des Lucioles, F-06921 Sophia Antipolis Cedex, FRANCE, pp. 1-49 (Jan. 2001).

* cited by examiner

*Primary Examiner*—David C. Payne
*Assistant Examiner*—Aslan Ettehadieh
(74) *Attorney, Agent, or Firm*—Blakely, Sokoloff, Taylor & Zafman LLP

(57) ABSTRACT

A digital receiver comprises a quadrature zero intermediate frequency tuner supplying I and Q components to adjustable low pass analog filters. In the case of OFDM signals, a demodulator contains a measuring arrangement which determines the average power of carriers at the band edges and the average power of the OFDM carriers. These are compared and a controller increases the passbands of the filters 7 and 8 until the average level of the edge carrier is substantially equal to the average level of all of the carriers.

28 Claims, 4 Drawing Sheets

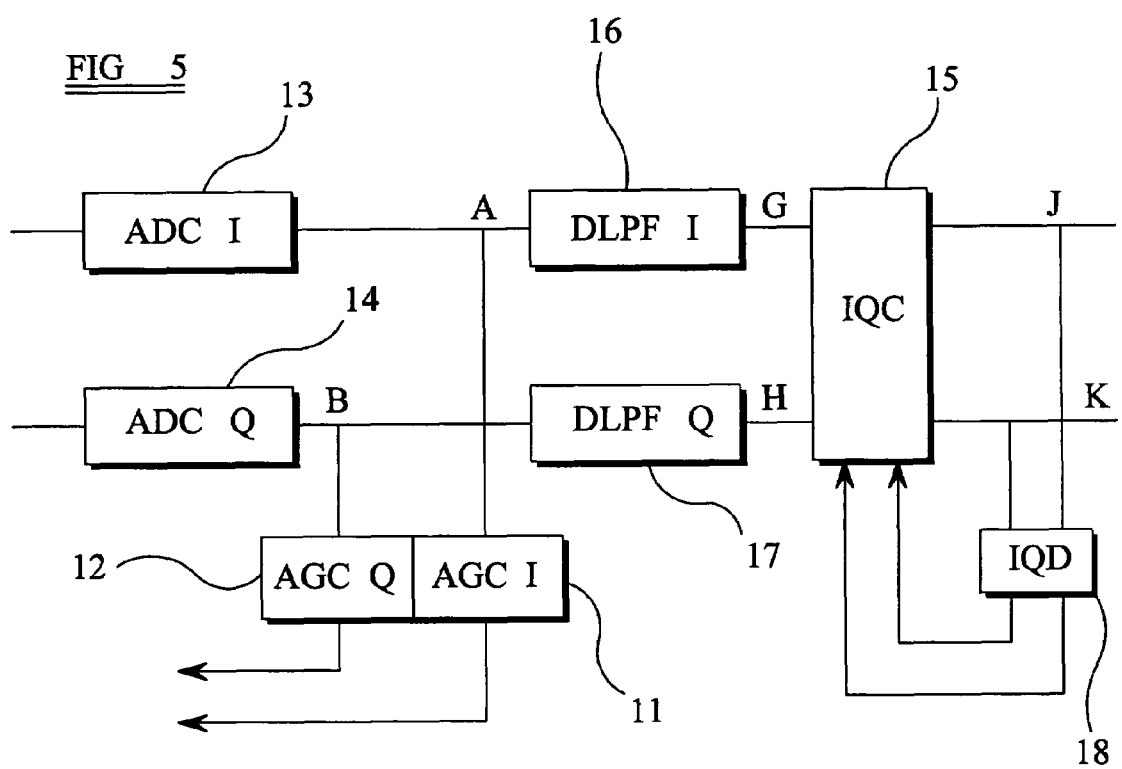

OPTIMIZING A FILTER BANDWIDTH IN A DIGITAL RECEIVER

TECHNICAL FIELD

The present invention relates to a digital receiver. Such a receiver may be used for receiving digital terrestrial television (DTTV) signals and digital audio broadcasting (DAB) signals. Such a receiver is suitable for orthogonal frequency division multiplex (OFDM) reception but may be suitable for receiving signals with other modulation standards. A variant of OFDM is used in very high speed digital subscriber lines (VDSL) and such a receiver is suitable for such an application.

BACKGROUND

A known type of DTTV receiver for receiving OFDM signals converts any selected channel for reception to a non-zero intermediate frequency. Surface acoustic wave (SAW) filters are used for filtering the intermediate frequency signal so as to pass the desired channel to, and substantially exclude other channels from, a demodulator. The intermediate frequency signal is digitised and then supplied to a digital demodulator, which extracts the in-phase (I) and quadrature (Q) channels. However, such arrangements have various disadvantages, including the need to provide off-chip discrete SAW filters.

Tuners of the zero intermediate frequency type are known for receiving digital satellite television signals. In such arrangements, the selected channel is converted directly to I and Q baseband signals, which are filtered and then digitised for subsequent demodulation. Because the intermediate frequency signal is at baseband, the SAW filters can be replaced by two low pass filters, one in each of the I and Q channels. Such filters can be integrated in an integrated circuit.

Because of a variety of factors including process variations, it is difficult or impossible to arrange for the passbands of such analog low pass filters to be exactly as required. If the filter passband is too large, it will allow high power adjacent channels to be passed and this leads to degraded performance. Conversely, if the passbands are too small, useful parts of the spectrum of the received channel will be lost and again degraded performance results. Also, the I and Q filters may have different passbands as a result of process variations and other factors.

It is known for such analog low pass filters to be adjustable so that the passbands can be adjusted and set during alignment or use of a receiver of this type. Known techniques rely on adjusting the passbands while monitoring the bit error rate from a subsequent demodulator in order to achieve an acceptable performance. However, adjustments based on bit error rate (BER) are relatively slow. In particular, after each adjustment to the filter passbands, a significant time delay has to be allowed for a valid estimate of the BER to be obtained in order to assess the result of the adjustment. Also, the BER does not by itself indicate whether the filter passbands are too wide or too narrow so that adjustment of the passbands is by undirected trial and error.

SUMMARY

According to the invention, there is provided a digital receiver comprising a tuner for converting a selected channel to a baseband channel signal, an adjustable low pass filtering arrangement for filtering the baseband signal, a first measuring arrangement for measuring a first value as a first function of the signal level of at least one baseband signal component whose frequency is adjacent an edge of the baseband channel and for measuring a second value as a second function of the signal level of at least one second baseband signal component whose frequency is further from the edge of the baseband channel than that of the at least one first baseband signal component, and a controller for adjusting the passband of the low pass filtering arrangement such that the first and second levels have a predetermined relationship.

The filtering arrangement may be an analog filtering arrangement.

An analog-digital conversion arrangement may be provided between the filtering arrangement and the first measuring arrangement.

The tuner may be a single conversion zero intermediate frequency tuner.

The controller may be arranged initially to adjust the filtering arrangement to have a smaller passband than the bandwidth of the baseband channel. The controller may be arranged to increment the passband of the filtering arrangement until the predetermined relationship exists The receiver may comprise a demodulator including the first measuring arrangement.

The first measuring arrangement may be arranged to perform a Fourier transform. The Fourier transform may be a discrete Fourier transform. As an alternative, the Fourier transform may be a fast Fourier transform.

The selected channel may be orthogonal frequency division multiplexed. The first value may be measured as an average of the levels of a first plurality of carriers whose frequencies are adjacent the edge of the baseband channel. The carriers may include at least one pilot carrier and the average may be a weighted average. The average may be formed over a plurality of symbols, such as consecutive symbols.

The second value may be measured as an average of the levels of a second plurality of carriers. The second plurality of carriers may comprise all of the carriers. As an alternative, the second plurality of carriers may comprise all of the carriers except those of the first plurality. The average may be formed over a plurality of symbols, such as consecutive symbols.

The predetermined relationship may be that the first and second levels are substantially equal to each other.

The baseband channel signal may comprise in-phase and quadrature components. The filtering arrangement may comprise first and second adjustable low pass filters for the in-phase and quadrature components, respectively.

The receiver may comprise a second measuring arrangement for measuring the levels of the in-phase and quadrature components after filtering by the first and second filters, the controller being arranged to adjust at least one of the first and second filters so that the filtered in-phase and quadrature components have substantially the same level.

The receiver may comprise an automatic gain control arrangement responsive to the output of the analog-digital conversion arrangement for providing substantially constant average input levels to the analog-digital conversion arrangement. The receiver may comprise a gain and phase compensating arrangement for compensating the in-phase and quadrature components from the analog-digital conversion arrangement.

The receiver may comprise first and second digital low pass filters for filtering the in-phase and quadrature components, respectively. The compensating arrangement may be responsive to the components filtered by the first and second low pass digital filters.

The second measuring arrangement may be arranged to measure the levels of the components before filtering by the first and second low pass digital filters and the controller may be arranged to reduce the passband of the one of the first and second low pass filters corresponding to the component of larger level. As an alternative, the second measuring arrangement may be arranged to measure the levels of the components after filtering by the first and second low pass digital filters and the controller may be arranged to reduce the passband of the one of the first and second low pass filters corresponding to the component of smaller level.

It is thus possible to provide an arrangement which allows the passbands of adjustable filters for baseband components to be adjusted accurately and relatively quickly. Such an arrangement makes possible the use of integrated analog filters which do not need to be highly specified in respect of their passbands. It is therefore possible to provide a receiver of improved performance and reduced cost of manufacture.

BRIEF DESCRIPTION OF THE DRAWINGS

FIG. 5 is a block schematic diagram illustrating a possible modification to the receiver of FIG. 1.

DETAILED DESCRIPTION

Figure 1:
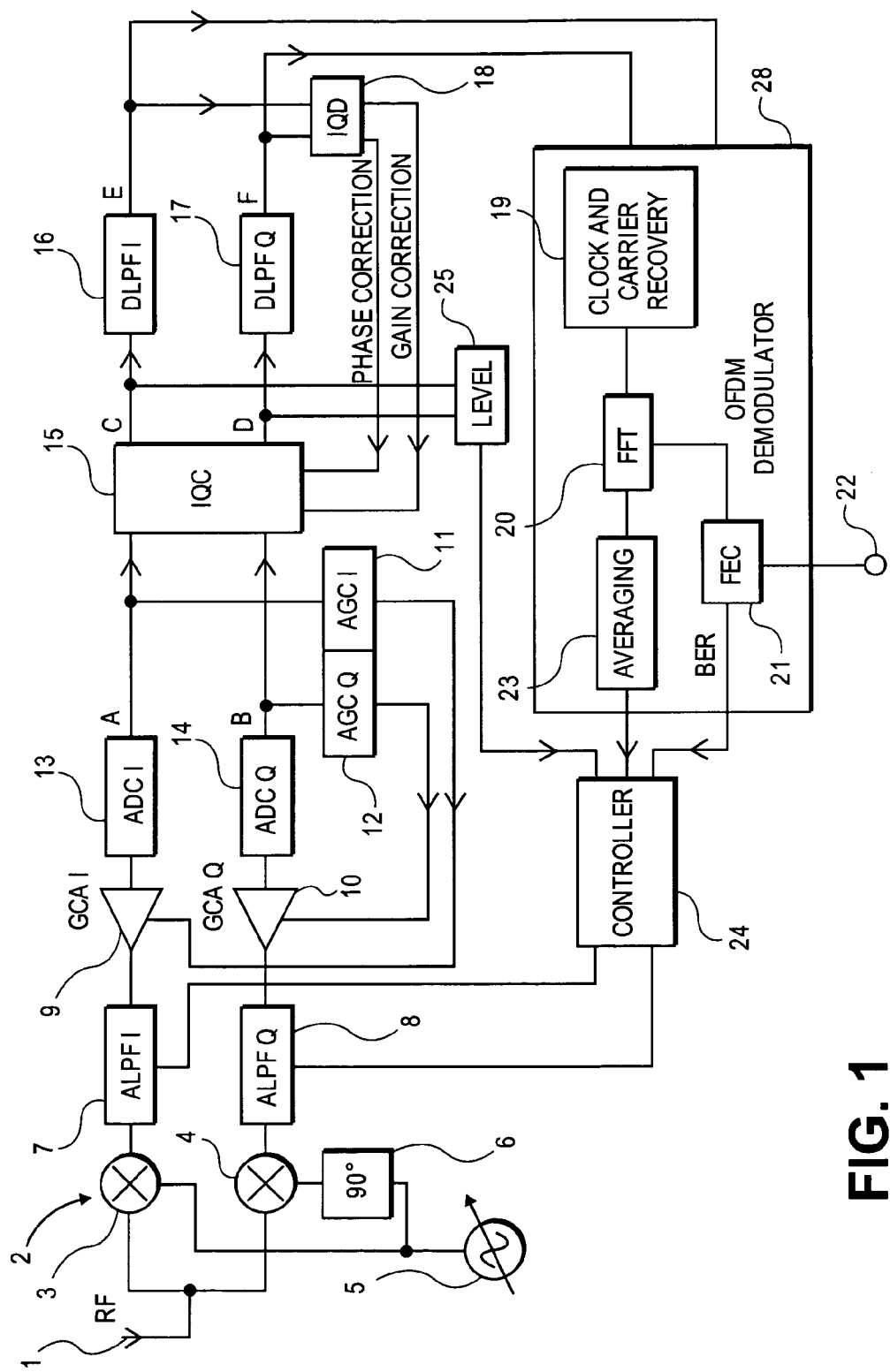
FIG. 1 is a block schematic diagram of a receiver constituting an embodiment of the invention.

The receiver shown in FIG. 1 is intended for digital terrestrial television (DTTV) reception of orthogonal frequency division multiplexed (OFDM) signals in accordance with the standard defined in "ETSI EN 300 744 Digital Video Broadcasting; Framing structure, channel coding and modulation for digital terrestrial television". However, such a receiver may be used in other applications, such as for receiving digital audio broadcast (DAB) signals, digital satellite broadcast (DSB) signals and the like. Such a receiver is capable of receiving any type of OFDM signal and may be capable of use for receiving signals having other modulation standards, such as single-carrier quadrature amplitude modulation (QAM) signals.

The receiver comprises a radio frequency (RF) input 1 for connection to a terrestrial television aerial. The input 1 is connected to a zero intermediate frequency quadrature frequency changer 2 comprising mixers 3 and 4, a local oscillator 5 and a 90° phase shifting network 6. The local oscillator 5 is tunable under user control in order to select a channel from a broadband input signal for reception. In particular, the user selects a channel for reception and the oscillator 5 is tuned to the centre frequency of the channel in the broadband radio frequency input signal. The local oscillator signal is supplied directly to the mixer 3 and via the phase shifting circuit 6 to the mixer 4. The mixers 3 and 4 thus convert the selected channel to baseband in-phase (I) and quadrature (Q) signals or components, respectively. Tuners of this type are well-known and the present tuner will not therefore be described further.

The I and Q components are supplied to adjustable analog low pass filters (ALPF I and Q) 7 and 8, respectively. The receiver is embodied as one or more monolithic integrated circuits and the filters 7 and 8 are integrated therein as any suitable implementation. The filters are required to pass the baseband I and Q components with minimum degradation while attenuating possible interfering signals. The filters 7 and 8 also act as anti-aliasing filters in respect of the subsequent analog-digital conversion. In a typical example, the filters 7 and 8 are embodied using gyrator techniques as sixth order Chebychev or Caur filters.

Figure 4:
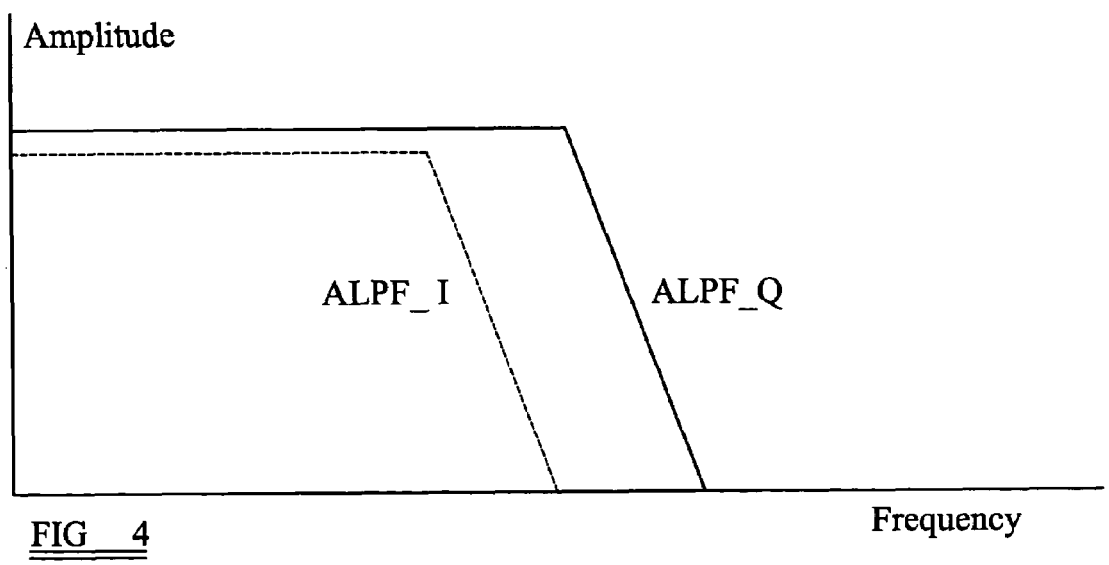
FIG. 4 illustrates the possible passbands of analog filters as manufactured.

In a typical DTTV application, the channels have a bandwidth of 8 MHz with the useful OFDM carriers occupying a bandwidth of 7.6 MHz. The low pass filters are therefore required to provide substantial attenuation to signals in the baseband above 3.8 MHz while providing minimal degradation of baseband signals below this cut-off or turnover frequency. However, it is difficult to integrate filters of reasonable cost having precisely set cut-off frequencies. Various factors contribute to deviation from the nominal cut-off frequency, such as variations in the manufacturing process. Furthermore, as illustrated in FIG. 4, the cut-off frequencies and performances of the individual filters 7 and 8 may also be different from each other. In a typical example, the absolute tolerance of a fixed cut-off frequency may be plus or minus 20% and the matching tolerance between filters may be a few %, such as plus or minus 2%. The filters 7 and 8 are therefore embodied as adjustable filters whose cut-off frequencies, and hence passbands, are adjusted as described hereinafter.

The outputs of the filters 7 and 8 are supplied to variable gain control amplifiers (GCA I and Q) 9 and 10, whose gains are controlled by automatic gain control (AGC I and Q) arrangements 11 and 12, respectively. The outputs of the amplifiers 9 and 10 are connected to analog-digital converters (ADC I and Q) 13 and 14, respectively, whose outputs are provided at nodes A and B connected to the inputs of the circuits 11 and 12 and to the inputs of a phase and gain imbalance correction module (IQC) 15. Other circuits, such as DC rejection and impulse suppression circuits, which may be present in the "front-end" of the demodulator, have been omitted from the description as they are, not relevant to understanding this embodiment. The automatic gain control arrangement comprising the amplifiers 9 and 10 and the control circuits 11 and 12 is provided to ensure that a relatively constant average signal level is supplied to the converters 13 and 14 so as to avoid excessive signal clipping in the converters 13 and 14 while avoiding excessive quantisation noise. The arrangement shown has individual control circuits 11 and 12 for the gain control amplifiers 9 and 10, respectively, and this takes into account any variations in amplifier characteristics. However, as an alternative, a single controller may be used to control the gain of both amplifiers 9 and 10 on the basis of the sum of the signal levels at the nodes A and B.

The compensation module 15 supplies compensated digital I and Q components at nodes C and D and to the inputs of digital low pass filters (DLPF I and Q) 16 and 17, respectively. The performances of the digital filters 16 and 17 can be relatively accurately specified so that these filters have fixed characteristics. The analog filters 7 and 8 provide only partial suppression of, for example, adjacent channels and the digital filters 16 and 17 ensure that sufficient suppression of the adjacent channels is provided before demodulation.

A module (IQD) 18 receives the filtered signals at nodes E and F from the outputs of the filters 16 and 17 and estimates phase and gain imbalances for the I and Q components. The module 18 supplies phase and gain correction signals to the compensation module 15 so as to compensate for such imbalances. The module 18 receives the signals after filtering by the digital filters 16 and 17 to ensure that substantially only useful signals contribute to the imbalance calculations. Thus, estimation accuracy is not substantially affected by out-of-band frequency components.

Arrangements for performing the functions of the modules 15 and 18 are well-known to the man skilled in the art and details of construction and operation will not therefore be further described.

The compensated and digitally filtered I and Q components are supplied to an OFDM demodulator 28. The demodulator 28 comprises a clock and carrier recovery module 19, a fast Fourier transform (FFT) module 20, and a forward error correction (FEC) module 21. The modules 19 to 21 are of any suitable type and such modules are well-known to a person skilled in the art. The module 21 effectively supplies the demodulated channel signal to a receiver output 22.

The FFT module 20 supplies carrier level information to an averaging module 23 such that the modules 20 and 23 provide a measuring function as described hereinafter. The FEC module 21 also estimates a bit error rate (BER) which, together with the output of the averaging module 23, is supplied to a controller 24 for controlling the cut-off frequencies of the analog filters 7 and 8. The controller also receives the output of a level measuring module 25, which measures the signal levels at the nodes C and D.

Figure 3:
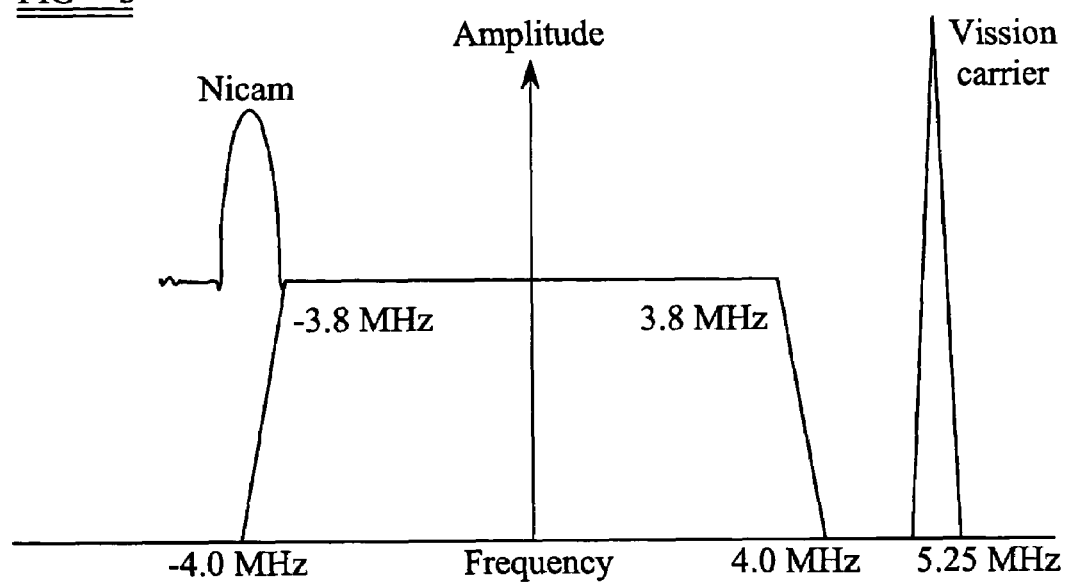
FIG. 3 is a graph illustrating the spectrum of a received baseband channel and adjacent potentially interfering signals.

FIG. 3 illustrates the baseband spectrum of a typical situation in which the selected channel is accompanied by adjacent potentially interfering channels. This spectrum is typical of that which would be present at the outputs of the mixers 3 and 4. In a typical situation, the desired digital channel is accompanied by upper and lower adjacent analog TV channels. In the lower adjacent analog channel, the near-instantaneous companded audio multiplex (NICAM) digital sound spectrum is very close to the edge of the desired OFDM spectrum. The NICAM signal is transmitted using differential quadrature phase shift keying (DQPSK) modulation.

The vision carrier of the upper adjacent analog channel is also shown in FIG. 3. The vision carrier is usually about 35 dB above the OFDM power spectral density (PSD). The NICAM sound carrier is typically 20 dB below the vision carrier. The other components of the analog TV signals are not shown in FIG. 3 but, when taken into account, when the lower adjacent vision carrier is set to 35 dB above the OFDM average power level, the peak DQPSK power in the NICAM signals is about 28 dB above the same average.

Figure 2:
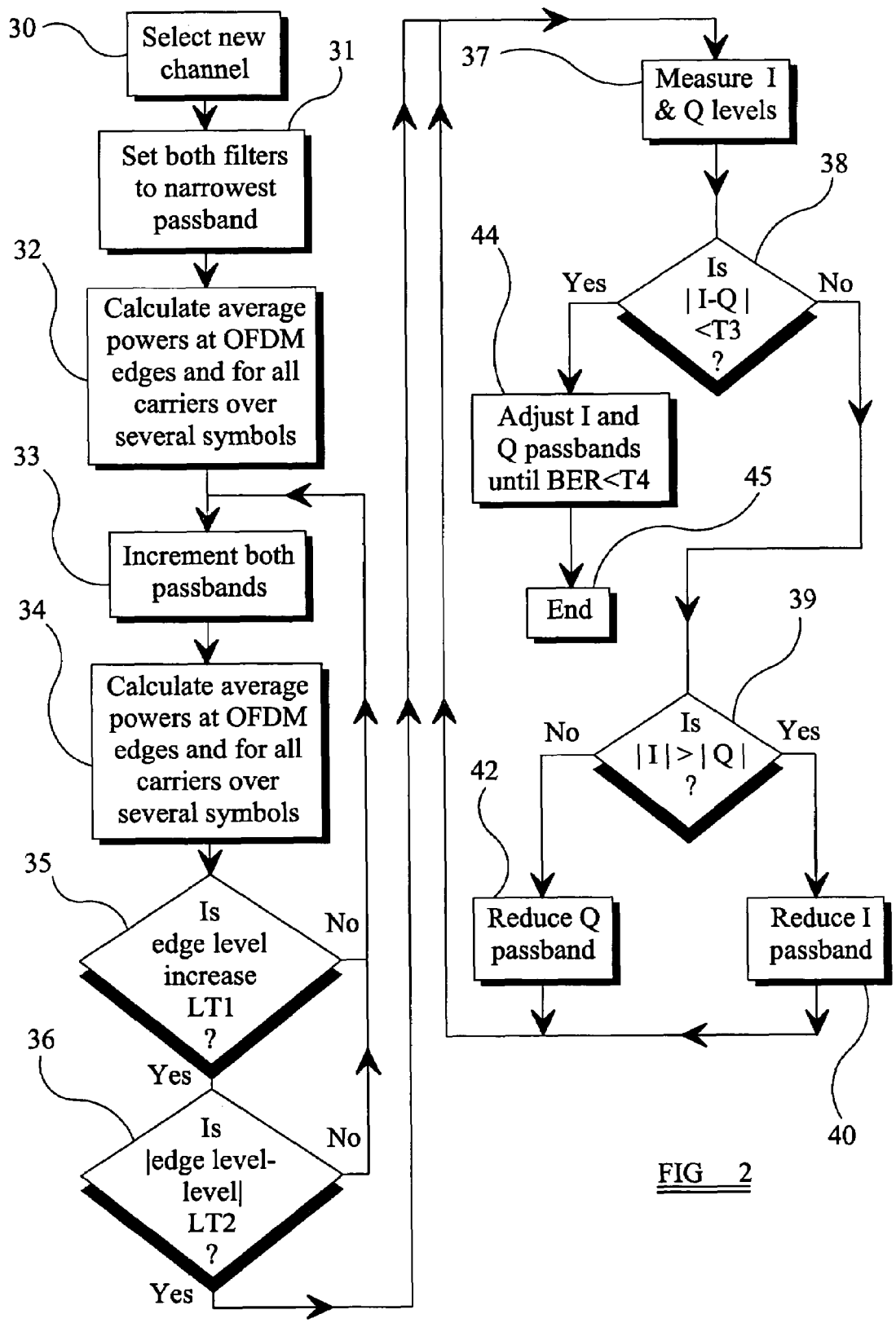
FIG. 2 is a flow diagram illustrating operation of the receiver of FIG. 1 to adjust analog low pass filters.

In order to set the cut-off frequencies or passbands of the analog filters 7 and 8, the technique illustrated in FIG. 2 is performed. This technique may be performed periodically or repeatedly or may be performed once during an alignment phase of manufacture of the receiver. However, this routine is more likely to be performed when the receiver is switched on or when a new channel is selected for reception as illustrated at 30. At 31, the controller 24 sets both of the filters 7 and 8 to the narrowest passbands. Although the passbands of the filters 7 and 8 cannot be accurately defined during manufacture, the tolerancing is in general known and the adjustment range of the filters is such as to ensure that the narrowest passbands will be less than the desired passband for correctly receiving the OFDM baseband signals. Thus, some of the edge carriers of the OFDM signal are substantially attenuated by the filters 7 and 8.

In a step 32, the average power in the two edges of the OFDM spectrum is calculated by the modules 20 and 23. Averaging may be performed over about 100 to 200 kHz in each range, which amounts to averaging over 23 to 45 OFDM carriers in the 2 K operating mode or 90 to 180 carriers in the 8 K mode. The actual implementation may be defined as a parameter which is programmable in the demodulator 28 by a control microprocessor or the like (not shown) of the receiver. This averaging is performed over several symbols to provide a first level. In the digital video broadcasting (DVB) DTTV standard, some carriers known as "pilots" are transmitted with increased power. However, these pilot positions are known and an appropriate adjustment, such as a weighted averaging, may be applied so as to obtain a more accurate or appropriate level.

At the same time, the average level of all of the OFDM carriers (including or excluding the carriers considered when measuring the first level) is calculated, again with weighting as necessary for pilot carriers and averaging over several consecutive symbols. This gives a second level and the two levels are stored as the average edge carrier power and the average OFDM power.

In a step 33, the passbands of both of the filters 7 and 8 are incremented by a predetermined amount by the controller 24. In a step 34, the calculations performed in the step 32 are repeated to give measurements reflecting the results on the edge carrier power and the average power following the increase in the filter passbands. Sufficient time is allowed between incrementing the passbands and performing the calculations in the step 34 for the effect of the passband increase to propagate to the output of the FFT module 20.

A step 35 determines whether the increase in the edge carrier power or level is less than a predetermined threshold T1. This step determines effectively whether the change in the filter passbands has had little effect on the measured edge carrier power. If the increase is greater than T1, the steps 33 and 34 are repeated.

When the increase in edge power is less than the threshold T1, a step 36 determines whether the difference between the edge carrier power and the average power is less than a second threshold T2. If not, this indicates that the filter passbands, or at least one of them, are too narrow such that at least some of the edge carriers are being unacceptably attenuated, in which case the steps 33 to 35 are repeated. When the edge level is substantially equal to the average level (the difference is less than the threshold T2), both filter passbands are sufficiently wide so as not to undesirably attenuate any of the OFDM carriers and control passes to a step 37.

If the modulation standard is not OFDM but is, for example, single-carrier QAM or QPSA, then it may be possible to use the FFT module 20 or a discrete Fourier transform technique to allow the power at the band-edge frequencies to be estimated. However, because of modulator pulse-shaping, the power at the band edges is relatively small and this technique may not, therefore, work well for single-carrier modulation techniques.

The steps 30 to 36 ensure that all of the OFDM carriers are within the passbands of both of the analog filters 7 and 8. However, as illustrated in FIG. 4, the filters 7 and 8 do not necessarily have the same cut-off frequency. Thus, if one of the filters has a higher cut-off frequency than the other, then it will pass any interfering signals adjacent the channel edge together with the desired I or Q component. In the situation illustrated in FIG. 3, for example, the filter of wider passband may pass some of the NICAM signal from the lower adjacent analog channel.

The automatic gain control arrangement 9-12 is such that the average amplitude levels at the nodes A and B are substantially the same because the control circuits 11 and 12 control the gains of the amplifiers 9 and 10, respectively, such that the amplitudes of the I and Q components at the outputs of the converters 13 and 14 (the nodes A and B) are substantially equal to a predetermined reference value. However, if the passband characteristics are as illustrated in FIG. 4, then the signal at the node A contains mainly the desired I component whereas the signal at the node B contains the required Q component as well as some of the adjacent channel energy. This would result in the power of the Q component being lower at the node B.

The digital filters 16 and 17 substantially filter out the adjacent channel power from the signal. In the absence of compensation, the signal power at the node F would be smaller than that at the node E because the filter 17 has substantially rejected the adjacent channel signal from the Q component. However, the module 18 detects such a difference in signal amplitude between the nodes E and F and causes the compensation module 15 to provide an imbalance correction such that the signal powers at the nodes E and F are substantially the same. As a result of this compensation, the power at the node D is higher than that at the node C by an amount determined by the adjacent channel power passed by the analog low pass filter 8.

The step 37 measures the "I" and "Q" levels at the nodes C and D, respectively; this measurement is performed by the level measuring module 25. The actual averaged power levels may be determined or, in order to simplify calculations somewhat, average voltage amplitude levels may be determined. A step 38 determines whether the absolute value of the difference between the levels I and Q is less than a third threshold T3 indicating that these levels are substantially the same. If so, a further adjustment routine to be described hereinafter is performed. If not, then a step 39 determines which of the levels I and Q is higher. If the level I at the node C is higher, then a step 40 reduces or decrements the passband of the analog filter 7 by means of the controller 24 and returns control to the step 37. The passband is decremented until substantial equality of the levels at the nodes C and D is measured indicating that the passband of the filter 7 has been narrowed sufficiently substantially to reject the adjacent channel energy.

Conversely, if the Q level is higher, the step 42 is performed such that the passband of the filter 8 is decremented until the signal levels at the nodes C and D are substantially equal. Thus, irrespective of mismatching between the filters 7 and 8, the steps 37 to 42 result in the passbands of each of the filters 7 and 8 being set substantially to the correct bandwidth.

In the absence of an interfering signal on either of the components from the filters 7 and 8, the step 38 detects substantially no difference in the levels at the nodes C and D so that the steps 39 to 43 are not performed irrespective of whether the filter passbands are matched or mismatched. However, in the absence of interference, mismatching between the filter passbands does not result in substantial degradation of reception quality and it is not therefore necessary to perform the steps 39 to 43.

In order to perform fine tuning of the passbands of both the filters 7 and 8, a routine 44 is performed. In particular the bit error rate is monitored and the effect on this of much smaller adjustments of the filter passbands is monitored. This may be performed until the BER is below a threshold T4 as shown in FIG. 2 such that an adequate performance is guaranteed. As an alternative, this may be performed so as to determine the minimum BER so as to give the optimum reception performance. Once this has been achieved, the adjustment is ended at 45.

Although adjustments based on BER are relatively slow, most of the necessary adjustment is performed in the steps 30 to 42 and is relatively quick so that the relatively slow adjustment based on BER is used only for fine tuning of the filter passbands. In fact, if the steps 30 to 42 provide adequate performance, the routine 44 may be omitted.

FIG. 5 illustrates a possible modification to the embodiment of FIG. 1. In this case, the digital low pass filters 16 and 17 are disposed between the analogue-digital converters 13 and 14, respectively, and the module 15. Thus, the nodes A and B are connected to the inputs of the digital filters 16 and 17, respectively, and to the inputs of the AGC controllers 11 and 12, respectively. The outputs of the filters 16 and 17 are provided at nodes G and H, respectively, which are connected to the module 15. The I and Q outputs of the module 15 are supplied to nodes J and K, respectively, which are connected to the inputs of the module 18. Otherwise, the receiver shown in FIG. 5 is substantially identical to that shown in FIG. 1 with the nodes G and H being connected to the module 25 and the nodes J and K being connected to the demodulator 28.

Operation of the modified receiver is similar to that described hereinbefore and illustrated in FIG. 2. However, there are some significant differences. In particular, if the passband of the analogue filter 8 is wider than that of the analogue filter 7, the average signal level at the node H is less than that at the node G. The reason for this is that the AGC arrangement maintains substantially the same average signal levels at the nodes A and B but the signal at the node B includes some adjacent channel signal power as well as the desired Q signal. The adjacent channel power is substantially removed by the filter 17 so that the average power at the node H is less than that at the node G. The operation illustrated in FIG. 2 then has to be modified such that the step 39 determines whether the absolute value of the level of the I signal is less than the absolute value of the level of the Q signal.

What is claimed is:

1. A digital receiver comprising:
a tuner for converting a selected channel to a baseband channel signal;
an adjustable low pass filtering arrangement for filtering said baseband signal;
a demodulator including a first measuring arrangement for measuring a first value as a first function of a signal level of at least one first baseband signal component of said baseband signal whose frequency is adjacent an edge of said baseband channel and for measuring a second value as a second function of a signal level of at least one second baseband signal component of said baseband signal whose frequency is further from said edge of said baseband channel than a frequency of said at least one first baseband signal component, wherein said first value is measured as an average of levels of a first plurality of carriers whose frequencies are adjacent said edge of said baseband channel; and
a controller for adjusting a passband of said low pass filtering arrangement such that said first and second values have a predetermined relationship, wherein the demodulator outputs a channel signal within the passband of said low pass filtering arrangement.

2. A receiver as claimed in claim 1, in which said filtering arrangement is an analog filtering arrangement.

3. A receiver as claimed in claim 1, comprising an analog-digital conversion arrangement between said filtering arrangement and said first measuring arrangement.

4. A receiver as claimed in claim 1, in which said tuner is a single conversion zero intermediate frequency tuner.

5. A receiver as claimed in claim 1, in which said controller is arranged initially to adjust said filtering arrangement to have a smaller passband than a bandwidth of said baseband channel.

6. A receiver as claimed in claim 5, in which said controller is arranged to increment said passband of said filtering arrangement until said predetermined relationship exists.

7. A receiver as claimed in claim 1, in which said first measuring arrangement is arranged to perform a Fourier transform.

8. A receiver as claimed in claim 7, in which said Fourier transform is a discrete Fourier transform.

9. A receiver as claimed in claim 7, in which said Fourier transform is a fast Fourier transform.

10. A receiver as claimed in claim 1, in which said selected channel is orthogonal frequency division multiplexed.

11. A receiver as claimed in claim 10, in which said carriers include at least one pilot carrier and said average is a weighted average.

12. A receiver as claimed in claim 10, in which said average is formed over a plurality of symbols.

13. A receiver as claimed in claim 12, in which said symbols are consecutive symbols.

14. A receiver as claimed in claim 10, in which said second value is measured as an average of levels of a second plurality of carriers.

15. A receiver as claimed in claim 14, in which said second plurality of carriers comprises all carriers.

16. A receiver as claimed in claim 14, in which said second plurality of carriers comprises all carriers except those of said first plurality.

17. A receiver as claimed in claim 14, in which said average is formed over a plurality of symbols.

18. A receiver as claimed in claim 17, in which said symbols are consecutive symbols.

19. A receiver as claimed in claim 1, in which said predetermined relationship is that said first and second levels are substantially equal to each other.

20. A receiver as claimed in claim 1, in which said baseband channel signal comprises in-phase and quadrature components.

21. A receiver as claimed in claim 20, in which said filtering arrangement comprises first and second adjustable low pass filters for said in-phase and quadrature components, respectively.

22. A receiver as claimed in claim 21, comprising a second measuring arrangement for measuring levels of said in-phase and quadrature components after filtering by said first and second filters, said controller being arranged to adjust at least one of said first and second filters so that said in-phase and quadrature components after filtering have substantially a same level.

23. A receiver as claimed in claim 22, comprising:
   an analog-digital conversion arrangement disposed between said filtering arrangement and said first measuring arrangement and having an output; and
   an automatic gain control arrangement responsive to said output of said analog-digital conversion arrangement for providing substantially constant average input levels to said analog-digital conversion arrangement.

24. A receiver as claimed in claim 23, comprising a gain and phase compensating arrangement for compensating in-phase and quadrature components from said analog-digital conversion arrangement.

25. A receiver as claimed in claim 24, comprising first and second digital low pass filters for filtering said in-phase and quadrature components, respectively.

26. A receiver as claimed in claim 25, in which said compensating arrangement is responsive to the components filtered by the first and second low pass digital filters.

27. A receiver as claimed in claim 25, in which said second measuring arrangement is arranged to measure levels of said components before filtering by said first and second low pass digital filters and said controller is arranged to reduce a passband of one of said first and second low pass filters corresponding to one of said components of larger level.

28. A receiver as claimed in claim 25, in which said second measuring arrangement is arranged to measure levels of said components after filtering by said first and second low pass digital filters and said controller is arranged to reduce a passband of the one of said first and second low pass filters corresponding to one of said components of smaller level.

* * * * *